United States Patent [19]

Meadows

[11] 4,032,621

[45] June 28, 1977

[54] PREPARATION OF HYDROGEN FLUORIDE WITH LOW LEVELS OF ARSENIC, IRON AND SULFITE

[75] Inventor: Geoffrey Walsh Meadows, Kennett Square, Pa.

[73] Assignee: E. I. Du Pont de Nemours and Company, Wilmington, Del.

[22] Filed: Nov. 24, 1975

[21] Appl. No.: 634,438

[52] U.S. Cl. .............................. 423/488; 423/483; 423/484

[51] Int. Cl.² .......................................... C01B 7/22

[58] Field of Search .................. 423/488, 484, 483

[56] References Cited

UNITED STATES PATENTS

| | | | |
|---|---|---|---|
| 3,166,379 | 1/1965 | Bradley et al. | 423/484 |
| 3,687,622 | 8/1972 | Garris | 423/488 |

FOREIGN PATENTS OR APPLICATIONS 268,386  8/1970  U.S.S.R.

OTHER PUBLICATIONS

McPherson & Henderson book "A Course in General Chem.", 1927, 3rd Ed. pp. 89, 90, Ginn & Co., N. Y.
J. H. Simons' book "Fluorine Chem.", vol. 1, 1950, p. 250, The Academic Press Inc., publishers, New York, N. Y.

Primary Examiner—Edward Stern

[57] ABSTRACT

A process for preparing pure anhydrous hydrogen fluoride with decreased levels of arsenic, iron and sulfite by treating anhydrous hydrogen fluoride sequentially with an oxidizing agent, and then a heavy metal free reducing agent, distilling the resulting mixture and recovering the pure hydrogen fluoride.

6 Claims, No Drawings

PREPARATION OF HYDROGEN FLUORIDE WITH LOW LEVELS OF ARSENIC, IRON AND SULFITE

BACKGROUND OF THE INVENTION

1. Field of the Invention

This invention relates to a process for the preparation of pure anhydrous hydrogen fluoride from anhydrous hydrogen fluoride. More specifically, this invention relates to a process for preparing pure anhydrous hydrogen fluoride by treating anhydrous hydrogen fluoride sequentially with an oxidizing agent and a reducing agent prior to distillation.

2. Prior Art

Anhydrous hydrogen fluoride is manufactured by heating a mixture of fluorspar and sulfuric acid. The main impurities in the thus prepared hydrogen fluoride are fluosilicic acid, silicon tetrafluoride, sulfur dioxide, sulfuric acid and water. These impurities are usually removed by fractional distillation and the resulting hydrogen fluoride has a purity of about 99.8% or better. However, hydrogen fluoride thus produced usually also contains minor amounts of certain other impurities which include arsenic, sulfite and iron. In the electronics industry, aqueous solutions of hydrogen fluoride are used as cleaning agents and etchants in the production of semiconductors, diodes and transitors. A high degree of purity and extremely low levels of the above impurities are required to prevent minute quantities of said impurities from remaining on the surface of said electronic industry products after they have been etched or cleaned with the hydrogen fluoride, thereby adversely affecting their function.

Several processes have been proposed for the preparation of high purity hydrogen fluoride which substantially reduce the presence of the undesirable impurities referred to above. Among such are processes that involve repeated fractional distillation in fluoroplastic equipment. However, such methods are suitable only for the preparation of small quantities of high purity hydrogen fluoride and not considered to be economical for producing commercial quantities. More attractive processes from the standpoint of commercial utility are those which are based on the conversion of the impurities to nonvolatile products by oxidizing said impurities with permanganate or chromate salts and recovering pure hydrofluoric acid with decreased impurities by simple distillation. These oxidation processes are suitable for the purification of aqueous hydrofluoric acid but they suffer from the drawback that when anhydrous hydrogen fluoride is distilled in the presence of permanganate or chromate salts, volatile manganese or chromium compounds contaminate the distillate. Thus, although the arsenic and sulfite levels are greatly decreased, the presence of large amounts of manganese or chromium, 100 ppm or higher, renders the hydrogen fluoride unsuitable for electronic and other applications which require a high degree of HF purity. A solution to this problem is claimed in U.S. Pat. No. 3,639,370 which describes a process involving the addition of an inorganic ferrous salt to the anhydrous hydrogen fluoride after the permanganate or chromate treatment to reduce excess oxidizing agents. We have found that this process results in a high level of iron contamination and consequently there is a need for a process that effectively decreases impurities in anhydrous hydrogen fluoride without introducing new impurities from the reagents used in the process.

SUMMARY OF THE INVENTION

In accordance with the invention a process for the preparation of pure anhydrous hydrogen fluoride with decreased amount of impurities from commercial anhydrous hydrogen fluoride has been discovered which comprises contacting commercial anhydrous hydrogen fluoride with an oxidizing agent, reducing excess oxidizing agent with a heavy metal free reducing agent, distilling the resultant mixture and recovering a very high purity anhydrous hydrogen fluoride with decreased impurities in the distillate.

Thus, the process of the present invention involves contacting anhydrous hydrogen fluoride containing impurities selected from arsenic, iron and sulfite, sequentially with an oxidizing agent and a heavy metal free reducing agent followed by distillation and recovery of the hydrogen fluoride with substantially less of the aforesaid impurities.

In the present application reference to anhydrous hydrogen fluoride means a commodity consisting of at least 97% by weight of hydrogen fluoride and hydrofluoric acid means aqueous hydrofluoric acid containing more than 30% water.

Hydrogen fluoride is made from fluorspar, a naturally occurring calcium fluoride by reaction with sulfuric acid. The main impurities that result from such a reaction (fluosilicic acid, silicon tetrafluoride, sulfur dioxide, sulfuric acid, water) are usually removed by fractional distillation. The use of hydrogen fluoride as a cleaning agent and etchant in the electronics industry requires very low concentrations of impurities such as arsenic, sulfite and iron. The degree to which these impurities are present in commerical anhydrous hydrogen fluoride depends largely on the source of fluorspar. In commercial manufacture, technical grade hydrogen fluoride is finally purified by one or two distillation steps which do not sufficiently reduce the concentration of the aforesaid impurities to levels acceptable in electronics uses. The process of the present invention removes impurities such as arsenic, iron and sulfite that are not effectively removed by conventional distillation. These impurities are oxidized to nonvolatile species and, provided excess oxidizing agent is then removed by a suitable reducing agent, pure anhydrous hydrogen fluoride is obtained by distillation.

The oxidizing agents of the present invention are selected from the group consisting of alkali metal permanganates and alkali metal dichromates, preferably alkali metal permanganates and most preferably potassium permanganate. It is preferred that the oxidizing agent may be added as an anhydrous solid but it may also be added as an aqueous solution provided the amount of water introduced is less than 3% based on the weight of hydrogen fluoride.

The amount of oxidizing agent required depends upon the extent to which impurities are present in the hydrogen fluoride. While a small excess of oxidizing agent over the stoichiometric requirement should be used, greater quantities are not harmful. In practice, excesses of oxidizing agent will be limited by economic considerations. The oxidizable impurities in anhydrous hydrogen fluoride rarely exceed 0.05% and usually are less than 0.01%. Accordingly, the amount of oxidizing agent required is not great. Generally, the amount of oxidizing agent used is from 1 gram equivalent to 5 gram equivalents preferably from 1.1 gram equivalent to 2 gram equivalents based on the total oxidizable impurities.

The oxidation reaction takes place quite rapidly at ambient temperatures and the process can be conducted with hydrogen fluoride under reflux or non-reflux conditions with some agitation by a stream of inert gas bubbles or a suitable stirring device to insure sufficient contact between the oxidizing agent and the impurities present in the hydrogen fluoride. Usually oxidation is complete in a period of from a few minutes to 30 minutes at a temperature near the boiling point of hydrogen fluoride. Oxidation takes place more rapidly at higher temperatures. The boiling point of hydrogen fluoride is 19.5° C and pressurized equipment is required if higher temperatures are used.

The reducing agents of the present invention may be any compound that will reduce excess permanganate or dichromate ions present in the oxidizing agent without itself introducing an objectionable impurity in the pure anhydrous hydrogen fluoride of this invention. The reducing agents of the present invention are heavy metal free compounds selected from the group consisting of alkali metal percarbonates, alkali metal perborates and hydrogen peroxide. Thus, the reducing agents of the present invention may be selected from the group consisting of sodium percarbonate, potassium percarbonate, sodium perborate, potassium perborate and hydrogen peroxide. Additional reducing agents within the scope of the present invention include organic reducing agents such as methanol, oxalic acid and hydroquinone, which are oxidized to gaseous by-products and water or nonvolatile residues. Organic reducing agents, however, introduce the possibility of undesirable contamination of the hydrogen fluoride with carbonaceous material.

The preferred reducing agent of the present invention is hydrogen peroxide. Hydrogen peroxide has been found to be particularly effective in the process of the present invention due to the fact that the reduction of excess oxidizing agent to nonvolatile metal cations takes place very rapidly at ambient temperatures. Additionally, if concentrated hydrogen peroxide is used, for example 70%, the amount of water introduced is not sufficient to greatly affect the hydrogen fluoride liquid-vapor equilibrium. Sufficient reducing agent should be added to reduce all the excess oxidizing agent. It is preferred to use an excess over the stoichiometric amount of the reducing agent required based on the amount of unreacted oxidizing agent originally present. Generally, an excess of about 1 to 5 gram equivalents is preferred. The reducing agent in the process of the present invention is required in order to remove excess oxidizing agent and to reduce metal containing species present, e.g., permanganate and dichromate, to nonvolatile residues before distillation of the hydrogen fluoride. This must be accomplished without introduction of undesirable contaminants which are volatile in an essentially anhydrous system. Following the addition of the reducing agent the hydrogen fluoride is stirred or maintained under reflux for a few minutes prior to distillation. Since the impurities are converted to residues with low volatility compared to hydrogen fluoride, elaborate fractionation is not necessary to separate said impurities in the present process. Thus, distillation at either atmospheric or higher pressure is effectively conducted in a column with an efficiency of one theoretical plate or less.

The process of the invention must be conducted in equipment which is not attacked by anhydrous hydrogen fluoride to avoid contamination by extraneous material. Thus all surfaces of the distillation vessel, column, column packing, condenser and receiver which come into contact with hydrogen fluoride must be inert towards it. Suitable materials of construction are metals such as low carbon steel, nickel and nickel alloys such as Inconel, Hastalloy Alloys B, C and D, Carpenter 20, Durimet 20 and platinum. Of these, low carbon steel is preferred from the standpoint of economy. Stainless steels are generally not suitable due to the possibility of trace contamination from alloy constituents. Polymeric materials such as polyethylene, unplasticized polyvinyl chloride and fluorocarbon polymers such as Teflon can also be used, and of these Teflon or similar fluorocarbon polymers are preferred.

Although the process of the invention is primarily directed to the preparation of very pure anhydrous hydrogen fluoride for critical uses, such as those in the electronics field, it also results in the production of technical grade hydrogen fluoride of improved quality.

The commercial grade anhydrous hydrogen fluoride purified in the process of the present invention is anhydrous hydrogen fluoride having a concentration of at least about 97% by weight hydrogen fluoride.

In the following examples which further illustrate the invention all references to parts and percentages are by weight unless otherwise indicated.

EXAMPLE 1

The apparatus was constructed from steel and consisted of a distillation vessel, a column packed with steel helices and condenser attached to a Teflon receiver. The column and condenser were enclosed in water jackets and the receiver was cooled with solid carbon dioxide. The distillation vessel, which was immersed in a thermostatically controlled water bath, was fitted with a fine bore dip tube providing a stream of nitrogen bubbles to promote smooth distillation, and with a sample inlet port sealed with a Teflon diaphragm. Temperatures in the distillation vessel and the column were measured by iron constantan thermocouples enclosed in steel sheaths.

One part by weight of potassium permanganate (Certified ACS crystal) and 600 parts by weight of hydrogen fluoride (commercial anhydrous) was added to the distillation vessel. The mixture was heated to 19.6° C and the column jacket was maintained at 5° to 6° C to reflux the hydrogen fluoride at atmospheric pressure. Green fumes of a volatile manganese compound which condensed to droplets of a dark green liquid were observed in the receiver. After refluxing for half an hour two parts by weight of 70% hydrogen peroxide was added to the distillation vessel by injection from a syringe through the Teflon diaphragm. After 10 minutes the column jacket temperature was raised to 18.6° C. The condenser water temperature was maintained at 3° to 5° C. Distilled hydrogen fluoride was collected in the receiver. The initial drops were pale green in color, but after a few minutes a colorless distillate was obtained and a new receiver was substituted to collect the product. The distillation vessel temperature was maintained at 19.6° to 19.7° C, the column jacket temperature was 17° to 18° C and the condenser temperature was 3° to 5° C. The distillation was continued for two and a half hours and 300 parts by weight of hydrogen fluoride were collected in the receiver. A 40% aqueous solution was prepared by adding the distilled hydrogen fluoride to ice made from distilled double deionized water. Analysis of this hydrofluoric acid for arsenic, iron and sulfite content is summarized in Table 1 below. The results are given in ppm expressed on a 100% HF basis. Comparison with the corresponding analyses on the original hydrogen fluoride shows that the content of the arsenic, sulfite and iron impurities are substantially decreased by the purification process to levels which are less than those commercially specified for electronic grade hydrofluoric acid.

EXAMPLE 2

The apparatus was the same as that used in Example 1 except that it is constructed entirely from Teflon and the distillation column was packed with Teflon shavings.

One part by weight of potassium permanganate (Certified ACS crystal) and 610 parts by weight of hydrogen fluoride (commercial anhydrous) were added to the distillation vessel and refluxed for half an hour as in Example 1. After the addition of two parts by weight of 70% hydrogen peroxide, hydrogen fluoride was distilled as described in Example 1. Three hundred ninety-four parts by weight of distillate were collected over a period of three hours. Forty-nine percent aqueous hydrofluoric acid was prepared by adding the distilled hydrogen fluoride to ice made from distilled double deionized water. Analysis of this hydrofluroic acid for arsenic, iron and sulfite content is summarized in Table 1 below. The results are given in ppm expressed on a 100% HF basis. Comparison with the corresponding analyses on the original hydrogen fluoride shows that the content of the arsenic, sulfite and iron impurities are substantially decreased by the purification process to levels which are less than those commercially specified for electronic grade hydrofluoric acid.

TABLE 1

| | Amount of Impurity in ppm (100% HF) | | |
|---|---|---|---|
| | Commercial | After Treatment | |
| Impurity | Anhydrous HF | Example 1 | Example 2 |
| Arsenic | 50 | 0.030 | <0.02 |
| Sulfite | 40 | <1.2 | <1.6 |
| Iron | 12 | 0.86 | 0.48 |
| Manganese | 0.06 | 0.20 | 0.14 |

COMPARATIVE EXAMPLE 1

One part by weight of potassium permanganate (Certified ACS crystal) and 470 parts by weight of anhydrous hydrogen fluoride (commercial anhydrous) were charged to the distillation vessel of the steel equipment of Example 1. The mixture was agitated under reflux at 20.2° to 20.9° C for half an hour. The column jacket temperature was increased from 7° C to 17.2° to 17.7° C and 200 parts by weight of a green distillate were collected over a period of one hour. The receiver was changed and the distillation vessel temperature was maintained at 19° to 20° C, the column jacket temperature was 17.5° to 18° C and the condenser temperature was 5° C. One hundred and fifty parts of a green distillate were collected in the receiver. A 40% aqueous solution was prepared by adding the distilled hydrogen fluoride to ice made from double deionized water. Analysis of this hydrofluoric acid for arsenic and manganese is summarized in Table 2 below. The results which are given in ppm expressed on a 100% HF basis clearly show that the arsenic content is decreased to a very low level. However, this is achieved at the expense of excessive manganese contamination. Thus, anhydrous hydrogen fluoride oxidized with potassium permanganate followed by distillation is unsuitable for electronic and other applications requiring a high degree of purity.

COMPARATIVE EXAMPLE 2

The steel equipment and procedure of Example 1 was used. One part by weight of potassium permanganate (Certified ACS crystal) was added to 3000 parts of anhydrous hydrogen fluoride (commercial anhydrous) containing 50 ppm of arsenic. The mixture was agitated under reflux at 19.5° to 21° C for 3 hours. To the hydrogen fluoride thus treated was then added 30 parts of a solution prepared by dissolving 10 parts of $FeSO_4 \cdot 7H_2O$ (Certified ACS crystal) in 40 parts of water and agitation under reflux is continued for one hour before subjecting the liquid thus prepared to simple distillation at 21.5° to 24.0° C. The distillation was continued for 1¾ hours and 170 parts by weight of hydrogen fluoride were obtained. A 66% aqueous solution was prepared by adding the distilled hydrogen fluoride to ice made from distilled double deionized water. Analysis of this solution shows that although the arsenic content was greatly decreased, the iron content was increased and was much higher than the electronic grade reagent specifications. The manganese content was higher than that achieved by the present process. Thus, the procedure of U.S. Pat. No. 3,689,370 resulted in greatly increased iron levels and significantly increased levels of manganese. This is illustrated in Table 2 below.

This process results in a very high iron content in the distilled hydrogen fluoride. Thus, the reduction of arsenic contamination was achieved at the expense of iron contamination and the thus treated hydrogen fluoride is unsuitable for electronic and other applications requiring a high degree of purity.

TABLE 2

| | Amount of Impurity in ppm (100% HF) | | |
|---|---|---|---|
| | Commercial | Comparative Examples | |
| | Anhydrous HF | 1 | 2 |
| Arsenic | 50 | <0.005 | 0.014 |
| Manganese | 0.06 | 170 | 0.56 |
| Iron | 12 | — | 31 |

Electronics industry specifications indicate that the maximum amount of the impurities shown below are as indicated:

| Arsenic | 0.06 | ppm |
|---|---|---|
| Sulfite | 4 | ppm |
| Manganese | 2 | ppm |
| Iron | 1 | ppm |
| (Based on 100% hydrogen fluoride). | | |

Thus, according to the process of the present invention, the levels of arsenic, iron and sulfite of anhydrous commercial hydrogen fluoride are reduced. Additionally, the process of the present invention reduces the manganese level below that of the process of U.S. Pat. No. 3,689,370.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as set forth in the claims.

What is claimed is:

1. A process for the preparation of pure anhydrous hydrogen fluoride with lower impurities which comprises sequentially contacting anhydrous hydrogen fluoride containing impurities selected from the group consisting of arsenic, iron and sulfite at ambient temperature with (a) more than the stoichiometric amount of an oxidizing agent selected from the group consisting of alkali metal permanganates and alkali metal dichromates to oxidize the impurities to the non-volatile species; (b) at least a stoichiometric amount based on the amount of unreacted oxidizing agent present of a heavy metal free reducing agent selected from the group consisting of alkali metal percarbonates, alkali metal perborates and hydrogen peroxide to reduce the unreacted oxidizing agent; and (c) distilling the resulting mixture and recovering a high purity anhydrous hydrogen fluoride with decreased impurities.

2. The process of claim 1 wherein the oxidizing agent is potassium permanganate.

3. The process of claim 1 wherein the oxidizing agent is potassium dichromate.

4. The process of claim 1 wherein the reducing agent is hydrogen peroxide.

5. The process of claim 4 wherein the oxidizing agent is potassium permanganate.

6. The process of claim 4 wherein the oxidizing agent is potassium dichromate.

* * * * *

UNITED STATES PATENT OFFICE
CERTIFICATE OF CORRECTION

PATENT NO. : 4,032,621
DATED : JUNE 28, 1977
INVENTOR(S) : GEOFFREY WALSH MEADOWS

It is certified that error appears in the above-identified patent and that said Letters Patent are hereby corrected as shown below:

Column 4, line 68, "40%" should be -- 49% --.

Signed and Sealed this

Twenty-first Day of February 1978

[SEAL]

Attest:

RUTH C. MASON
*Attesting Officer*

LUTRELLE F. PARKER
*Acting Commissioner of Patents and Trademarks*